United States Patent

[11] 3,624,270

| [72] | Inventor | Rex O. Turner<br>425 California Ave., Arroyo Grande, Calif. 93420 |
|---|---|---|
| [21] | Appl. No. | 13,673 |
| [22] | Filed | Feb. 24, 1970 |
| [45] | Patented | Nov. 30, 1971 |

[54] CONNECTING APPARATUS FOR TERMINATING ELECTRICAL CONDUCTORS
4 Claims, 8 Drawing Figs.

[52] U.S. Cl. ........................................... 174/87,
174/84 R, 174/138 F, 339/59 R, 339/105
[51] Int. Cl. ........................................ H02g 15/08
[50] Field of Search.......................... 174/74 A,
87, 92, 93, 84 R, 84 S, 138 F, 154–156; 339/105,
59, 108, 149, 242

[56] References Cited
UNITED STATES PATENTS
3,147,338 9/1964 Ekvall et al. ................... 174/92 X
3,325,591 6/1967 Wahl ........................... 174/92 X

*Primary Examiner*—Darrell L. Clay
*Attorney*—Nilsson, Robbins, Wills & Berliner ABSTRACT: A structure is disclosed for receiving the ends of a plurality of electrical conductors and holding them in clamped-together relationship so that the conductors are electrically interconnected yet are insulated from other objects. As disclosed, the apparatus includes an elongate body of resiliently deformable material, e.g., plastic, defining an elongate interior chamber, which body may be parted along mating edges to open the chamber. Variable-closure fastening means, in the form of interlocking ridges are defined at the mating edges to lock the body closed so that spaced-apart, opposed abutments (defined within the body and integral therewith) define a clamp (of variable size) to hold received conductors within the apparatus.

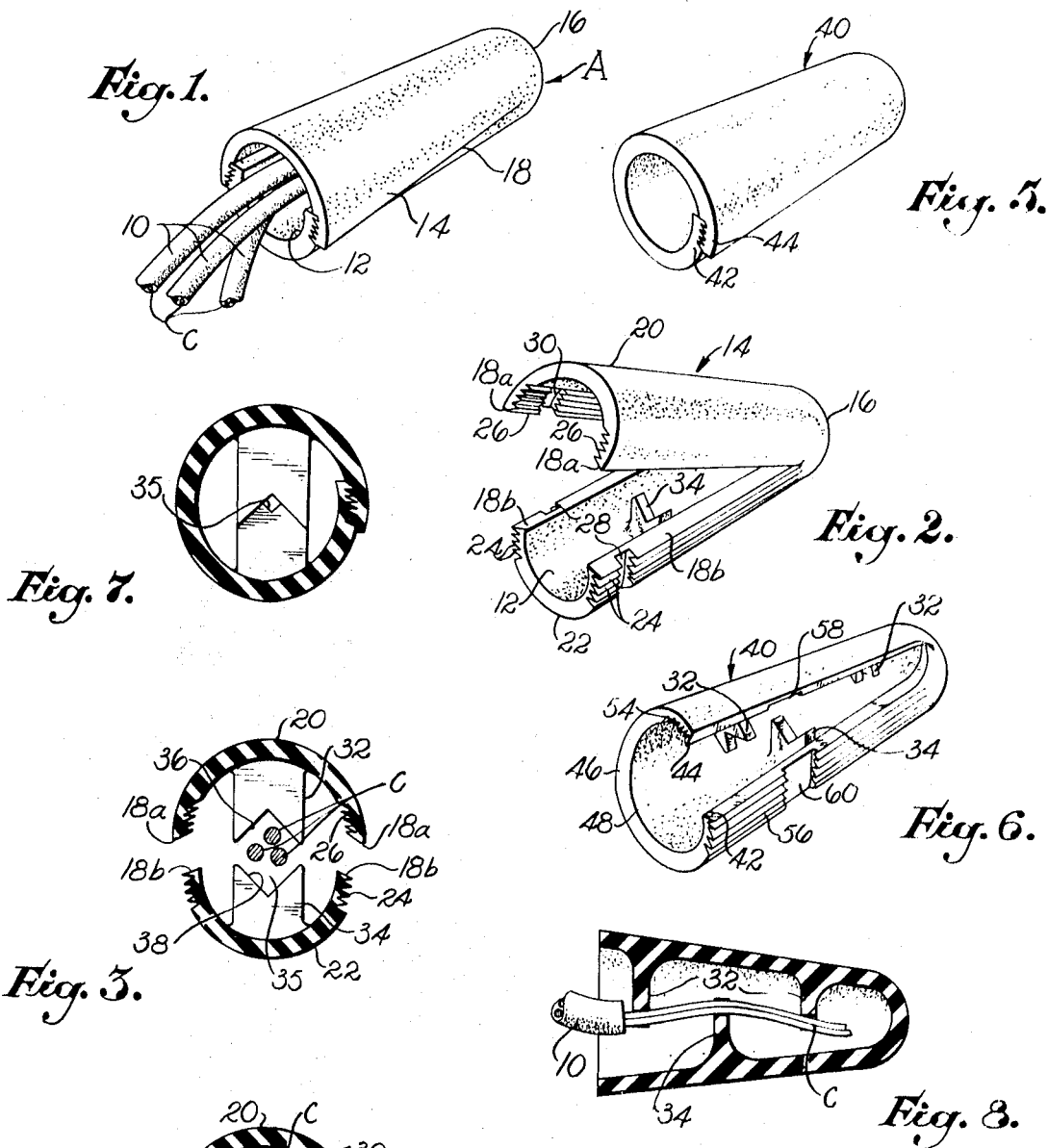

CONNECTING APPARATUS FOR TERMINATING ELECTRICAL CONDUCTORS

BACKGROUND AND SUMMARY OF THE INVENTION

In the installation of electrical wiring, the need frequently arises to interconnect the ends of a plurality of conductors as well as to provide an insulating shield over the connection. For a number of years this operation has been traditionally accomplished by twisting the wires together in spiralled relationship then applying an insulating cover of electrical tape. An improved technique resulted with the development of the so-called "electrical nut" consisting of an internally threaded sleeve, closed at one end and covered with an electrically insulating material. Electrical nuts are conventionally used to interconnect and shield a set of conductors by first aligning the conductors in parallel relationship then threading the nut into the set so that it is affixed to the conductors. However, in the use of electrical nuts, it is sometimes difficult to establish the desired threaded engagement between the nut and the conductors. This consideration is particularly true when the nut is not of a rather precise size in relationship to the set of conductors which are to be interconnected and covered. Consequently, electrical nuts conventionally have been manufactured and stocked in a wide variety of different sizes.

In addition to the difficulty which is sometimes experienced in attempting to thread an electrical nut over a set of conductors, another difficulty often arises in removing a previously installed nut to provide access to the conductors. Consequently, although conventional electrical nuts have resulted in a considerable improvement in the installation of electrical wiring they are not without difficulty. Further in this regard, in view of the great demand and extensive use of structures of this type, it is to be appreciated that substantially any improvement in the cost of manufacture, the ease of installation or the time required for installation represents a significant development.

In general, the present invention resides in an integrally formed structure which may be economically produced, as by injection molding techniques and which includes a protective body to insulate electrical conductors contained therein from other objects and which additionally provides mechanical support for elongate closure teeth and for conductor abutments so that the conductors in the body are clamped together when the body is fixed closed.

BRIEF DESCRIPTION OF THE DRAWING

In the drawings, which constitute a part of this specification, exemplary embodiments demonstrating various objectives and features hereof are set forth, specifically:

FIG. 1 is a perspective view of an electrical connection apparatus constructed in accordance with the present invention;

FIG. 2 is a perspective view of the apparatus of FIG. 1 shown in an open configuration;

FIG. 3 is a sectional view taken transversely through the structure as shown in FIG. 2 with conductors therein;

FIG. 4 is a sectional view taken transversely through the structure as shown in FIG. 1;

FIG. 5 is a perspective view of another form of apparatus constructed in accordance herewith;

FIG. 6 is a perspective view of the structure of FIG. 5 shown in an open configuration;

FIG. 7 is a sectional view taken transversely through the structure of FIG. 5; and FIG. 8 is a sectional view taken longitudinally through the structure hereof as shown in each of the FIGS. 1 and 5.

Referring initially to FIG. 1, there is shown an electrical connection apparatus A, embodying the present invention, affixed upon the ends of a set of conductors C. It is to be understood that the exposed portions of the conductors C are clad with insulation 10 while the terminal ends of the conductors C which are held within the apparatus A are exposed, i.e., bare, and are therefore electrically interconnected.

Considering the apparatus A in greater detail, the conductors C are received within an elongated chamber 12 which is defined within the body 14 of the apparatus A. The body 14 is in the form of an elongated tapered sleeve having the smaller end thereof closed to provide an end hinge section 16. That is, the body 14 defines longitudinal mating edges 18a and 18b, so that the body 14 may be closed to various degrees, and opened (FIG. 2) thereby affording access to the internal chamber 12 as a result of the flexibility of the hinge section 16. Thus, the body 14 may be considered to comprise a pair of half-cylinder tapered sections 20 and 22 joined at their small ends by the hinge section 16.

The exterior of the lower section 22 (as shown) defines several parallel elongate ridges 24 extending substantially the full length of the section and lying externally adjacent to the edges 18b. It is to be noted that the elongated teeth or ridges 24 extend downwardly for mating engagement with opposed teeth or ridges 26 which are defined inside the upper section 20 (as shown) and which extend in parallel relationship substantially the full length of the body 14.

The rows of ridges 24 and 26 are each broken by fragmentary annular slots 28 and 30 which are matingly aligned. These slots provide access to a tool to disengage the mated ridges 24 and 26 when the unit is closed.

Inside the body 14, opposing spaced-apart abutments 32 and 34 are affixed respectively to the upper and lower sections 20 and 22 of the body 14. Of course, various numbers of abutments may be employed variously displaced within the chamber 12; however, it has been found desirable to provide at least three abutments in order to lockingly crimp the received conductors C within the apparatus A (FIGS. 4 and 8) and additionally to accomplish such a locking feature by providing the abutments in spaced-apart relationship along the chamber 12. It is to be noted (FIG. 4) that the degree to which the abutments 32 and 34 close determines the size of a defined rectangle 35 in which the conductors C are held. Thus, a wide range of sizes for sets of conductors can be accommodated by a single size embodiment hereof. That is, as the sections 20 and 22 may be closed to various degrees (depending upon the engagement of the ridges 24 and 26), a wide range of different sizes for the clamping rectangle 35 (FIGS. 3 and 4) are defined.

In the manufacture of the apparatus as described above with reference to FIGS. 1, 2, 3, 4 and 8; various techniques may be utilized, as for example injection molding. In general, the material of the apparatus A may be somewhat flexible to accommodate the operation of the hinge section 16, yet the structure must also be resiliently deformable to accomplish the locking operation, yet sufficiently rigid to effectively clamp a set of the conductors C together. Accordingly, various materials have been selected including so-called "hard" rubber, various plastics, including nylon and polyvinylchloride utilizing a rather critical quantity of plasticizer to obtain the desired rigidity, as well known in the prior art, to accomplish the desired characteristics. Of course, the material comprising the apparatus A must have the character of a good electrical insulator.

The mold for the structure or apparatus A may take various forms as well known in the prior art; however, it has been determined somewhat advantageous to utilize an individual mold form of the apparatus substantially as depicted in FIG. 2. Accordingly, the upper and lower sections 20 and 22 are molded in spaced-apart relationship which tends to facilitate the insertion of the conductors C and provide a resilient spring force that is effective in locking the apparatus closed.

In using an individual connection apparatus as described above, the first step usually involves the removal of all insulation 10 (FIG. 1) from the ends of a set of conductors C which are to be interconnected. Next, the bare ends of the conductors C are aligned and placed within the chamber 12 so as to lie between the abutments 32 and 34 (FIG. 3). THereafter, the upper and lower sections 20 and 24 are urged together, as by a clamping tool, with the result that the upper edges 18a lap the lower edges 18b so that the external elongate teeth or ridges 24 matingly engage the elongate teeth or ridges 26 defined inside the upper section 20. Consequently, the conductors C are clamped together (FIG. 4) between the abutments 32 and 34 thereby crimping the conductors C somewhat as shown in FIG. 8. It is to be noted that the extent to which the upper and lower sections 20 and 22 overlap (number of ridges 24 and 26 that are interlocked) depends upon the size and number of the conductors C. That is, the rectangle 35 (FIG. 4) varies as the degree of overlap of the abutments 32 and 34 which define the triangular grooves or recessed surfaces 36 and 38 (FIG. 3). Thus, as the apparatus is locked together with variable overlap, by the elongate ridges 24 and 26, the conductors are crimped into intimate electrical contact by the closing rectangle 35 defined by the mating abutments 32 and 34. In the event it is desired to remove the cap apparatus A, a tool is simply inserted in between the slots 28 and 30 (FIG. 2) and raised to disengage the mated ridges 24 and 26. The sections 20 and 22 may then be separated for access to the conductors C.

To emphasize the variety of forms which may embody the present invention, another embodiment thereof is depicted in FIGS. 5, 6 and 7. As indicated above, the longitudinal sectional view through each of the two embodiments disclosed herein is similar to that as shown in FIG. 8.

The apparatus of FIG. 5 is generally similar to that previously described except that the elongate, somewhat tubular body 40 is open at only one side defining one pair of mating edges 42 and 44. THat is, the embodiment of FIG. 5, as also shown in FIG. 6, is molded to include a single slit defining edges 42 and 44 with the result that a hinge section 46 is provided along the length of the body 40 which lies substantially parallel and diametrically opposed to the edges 42 and 44 when interlocked, closed together. The interior chamber 48 is penetrated by abutments 32 and 34 similar to those previously described, extending transversely into the somewhat cylindrical chamber 48. The abutments 32 and 34 are, as previously described with respect to the prior embodiment, formed to define triangular indentations or grooves, so that as the apparatus is closed down upon a set of conductors C, the conductors are progressively compressed within a rectangle 35 (FIG. 7) of ever decreasing dimensions.

The upper edge 44 of the embodiment of FIG. 6 defines elongate ridges or teeth 54 on its internal surface while the outer surface of the edge 42 defines mating elongate teeth 56. The rows of teeth 54 and 56 are interrupted by slots 58 and 60 respectively for receiving a tool to release engagement between the teeth, as previously described with respect to the initial embodiment.

The production of the unit as depicted in FIGS. 5, 6 and 7 may be similar to that previously described as by injection molding techniques. The materials utilized in the production of the two embodiments may also be similar. The use of the second embodiment is very similar to that of the first. The end portions of conductors are initially bared and placed in parallel alignment within the somewhat cylindrical chamber 48 defined within the body 40 (FIG. 6). Next, the body 40 is closed as by a clamping tool, so that the teeth 54 matingly engage the teeth 56 in a locked relationship while the abutments 32 and 34 crimp and clamp the received conductors. Accordingly, a shape substantially as shown in FIG. 7 is attained in which the conductors are held in close proximity with electrical contact therebetween and with good mechanical rigidity.

Accordingly, it may be seen that the structures hereof afford a unit which is relatively economical to manufacture and simple and easy to use. Additionally, the structure hereof may be used with a relatively wide range of conductor sizes and provides a durable lasting connection apparatus which may be relatively simply and easily removed should the need arise to do so. Still other advantages of the present invention will become apparent to those skilled in the art and in that regard the scope of the present invention is set forth by the appended claims.

I claim:

1. An electrical connection apparatus for supportably engaging a plurality of conductors in electrically connected relationship comprising:
    a tapered cylindrical body of resiliently deformable insulating material, defining an internal elongated chamber closed at one end thereof, and including a hinge section whereby said body may be opened along at least one pair of elongated mating edges extending substantially parallel to the central axis of said body;
    fastening means integral with said body and including a plurality of interlocking members whereby said mating edges of said body may be locked together with different overlap therebetween; and
    conductor engaging means, integral with said body and including opposed, internally extending elements for clamping said conductors together on closure of said body at said hinge section.

2. An electrical connection apparatus according to claim 1 wherein said body comprises a tapered cylindrical form defining two pairs of mating edges extending substantially parallel to the central axis of said body.

3. An electrical connection apparatus according to claim 2 wherein said conductor engaging means comprises spaced-apart abutments terminating in grooved surfaces to receive said conductors therebetween.

4. An electrical connection apparatus according to claim 1 wherein said conductor engaging means comprises spaced-apart abutments terminating in grooved surfaces to receive said conductors therebetween.

* * * * *